(12) United States Patent
Lougheed et al.

(10) Patent No.: US 6,732,187 B1
(45) Date of Patent: May 4, 2004

(54) OPAQUE PACKET HANDLES

(75) Inventors: Kirk Lougheed, Atherton, CA (US); Ofrit Lesser, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/405,822

(22) Filed: Sep. 24, 1999

(51) Int. Cl.[7] .............................................. G06F 15/16
(52) U.S. Cl. ...................................... 709/245; 717/170
(58) Field of Search .......................... 709/245, 223, 709/230, 213, 206, 313, 218, 225, 108, 243, 246, 232; 707/201; 717/11, 170, 118; 713/201; 379/201; 370/249, 465, 432, 395; 345/430; 455/466

(56) References Cited

U.S. PATENT DOCUMENTS

| | | | | |
|---|---|---|---|---|
| 4,251,860 A | | 2/1981 | Mitchell et al. | 364/200 |
| 5,450,589 A | * | 9/1995 | Maebayashi et al. | 717/170 |
| 5,452,433 A | * | 9/1995 | Nihart et al. | 709/223 |
| 5,687,224 A | * | 11/1997 | Alley, Jr. et al. | 379/201 |
| 5,740,159 A | * | 4/1998 | Ahmad et al. | 370/249 |
| 5,790,130 A | * | 8/1998 | Gannett | 345/430 |
| 5,892,924 A | * | 4/1999 | Lyon et al. | 709/245 |
| 5,926,636 A | * | 7/1999 | Lam et al. | 709/313 |
| 5,938,736 A | * | 8/1999 | Muller et al. | 709/243 |
| 6,026,428 A | * | 2/2000 | Hutchison et al. | 709/108 |
| 6,044,402 A | * | 3/2000 | Jacobson et al. | 709/225 |
| 6,044,468 A | * | 3/2000 | Osmond | 713/201 |
| 6,072,806 A | * | 6/2000 | Khouri et al. | 370/465 |
| 6,148,329 A | * | 11/2000 | Meyer | 709/206 |
| 6,161,145 A | * | 12/2000 | Bainbridge et al. | 709/246 |
| 6,173,364 B1 | * | 1/2001 | Zenchelsky et al. | 711/118 |
| 6,185,734 B1 | * | 2/2001 | Saboff et al. | 717/11 |
| 6,230,193 B1 | * | 5/2001 | Arunkumar et al. | 709/218 |
| 6,253,234 B1 | * | 6/2001 | Hunt et al. | 709/213 |
| 6,279,041 B1 | * | 8/2001 | Baber et al. | 702/232 |
| 6,301,484 B1 | * | 10/2001 | Rogers et al. | 455/466 |
| 6,317,434 B1 | * | 11/2001 | Deng | 370/432 |
| 6,345,281 B1 | * | 2/2002 | Kardos et al. | 707/201 |
| 6,360,275 B1 | * | 3/2002 | Chu et al. | 709/245 |
| 6,405,219 B2 | * | 6/2002 | Saether et al. | 707/201 |
| 6,501,758 B1 | * | 12/2002 | Chen et al. | 370/395 |

OTHER PUBLICATIONS

An MBone Recorder/Player, Gary Hoo; www–itg.lbl.gov/~hoo/Thesis/thesis_b.htm—101k.*
Persley et al, Routing in Frequency–Hop Packet Radio Networks with Partial Band Jamming. IEEE 1993.*
Saad et al, The ALEX Object Manager, IEEE 1997.*
Blaauw et al., "Computer architecture: Concepts and evolution", 1997, Addison Wesley, pp. 142–143.

* cited by examiner

Primary Examiner—Jack B. Harvey
Assistant Examiner—Thong Vu
(74) Attorney, Agent, or Firm—Ritter, Lang & Kaplan LLP

(57) ABSTRACT

Systems and methods for managing packet memory. Various clients in a router need to read from and/or write to the contents of individual packets. In one embodiment, all accesses to packet memory are via a packet manager. Individual clients are issued packet handles to use in identifying particular packets to the packet manager. The packet manager translates between the packet handles and pointers to packet memory locations. To assure robust performance after restarting the packet manager, each packet handle indicates which run version of the packet manager was responsible for generating the handle. The packet manager refuses requests for packet access using handles generated by previous versions.

23 Claims, 5 Drawing Sheets

OPAQUE PACKET HANDLES

BACKGROUND OF THE INVENTION

The present invention relates to communication networks and more particularly to systems and methods for managing packets in a network device that processes packets such as a router.

In a typical router, packets to be forwarded via the router are temporarily stored in a high speed packet memory. The router includes a processing device that performs various operations on the packets stored in memory. The router software executing on the processing device is preferably divided into various routines or processes, referred to herein as clients. Many of these clients access the packet memory to read from packets, write to packets, allocate or deallocate memory space for packets, etc.

Problems, however, arise in permitting clients direct access to packet memory. Erroneous processing by any one client may result in that client using an incorrect pointer value to access packet memory. For example, a client may inadvertently overwrite the contents of a packet to which it is not permitted access, thereby affecting the operation of other clients and corrupting data relayed by the router. With numerous clients operating independently, the chances of one client corrupting packet data in this way are very high.

SUMMARY OF THE INVENTION

Systems and methods for managing packet memory are provided by virtue of the present invention. Various clients in a router need to read from and/or write to the contents of individual packets. In one embodiment, all accesses to packet memory are via a packet manager. Individual clients are issued packet handles to use in identifying particular packets to the packet manager. The packet manager translates between the packet handles and pointers to packet memory locations. To assure robust performance after restarting the packet manager, each packet handle indicates which run version of the packet manager was responsible for generating the handle. The packet manager rejects requests for packet access including handles generated by previous versions.

A first aspect of the present invention provides a method for providing packet processing routines with access to packets stored in a memory. The method includes using a packet manager routine to receive a request for access to a selected packet. The request includes a packet handle. The packet handle includes an identifier specifying a run version of the packet routine and an identifier specifying the selected packet. The method further includes: checking the run version specified in the packet handle against a current run version of the packet manager routine, and fulfilling the request only if the current run version matches the run version specified in the packet handle.

A second aspect of the present invention provides a method for providing packet processing routines with access to packets stored in a memory. The method includes transferring a packet handle from a packet processing routine to a packet management routine. The packet handle includes an identifier identifying a selected one of the packets. The method further includes: using the packet management routine to translate the identifier into a pointer to the memory, and accessing the memory at a location identified by the pointer.

A further understanding of the nature and advantages of the inventions herein may be realized by reference to the remaining portions of the specification and the attached drawings.

DESCRIPTION OF SPECIFIC EMBODIMENTS

Generally, the packet processing and management techniques of the present invention may be implemented in software and/or hardware. For example, they can be implemented in an operating system kernel, in separate user processes, in a library package bound into network applications, on a specially constructed machine, or on a network interface card. In a specific embodiment of this invention, these techniques may be implemented in software such as an operating system or in an application running on an operating system.

A software or software/hardware hybrid packet processing and management system of this invention is preferably implemented on a general-purpose programmable machine selectively activated or reconfigured by a computer program stored in memory. Such a programmable machine may be a network device designed to handle network traffic. Such network devices typically have multiple network interfaces including frame relay and ISDN interfaces, for example. Specific examples of such network devices include routers and switches. For example, the packet processing and management systems of this invention may operate on specially configured routers such as those available from Cisco Systems, Inc. of San Jose, Calif. A general architecture for some of these machines will appear from the description given below. In an alternative embodiment, the packet processing system may be implemented on a general-purpose network host machine such as a personal computer or workstation adapted to interface with computer networks.

Figure 1:
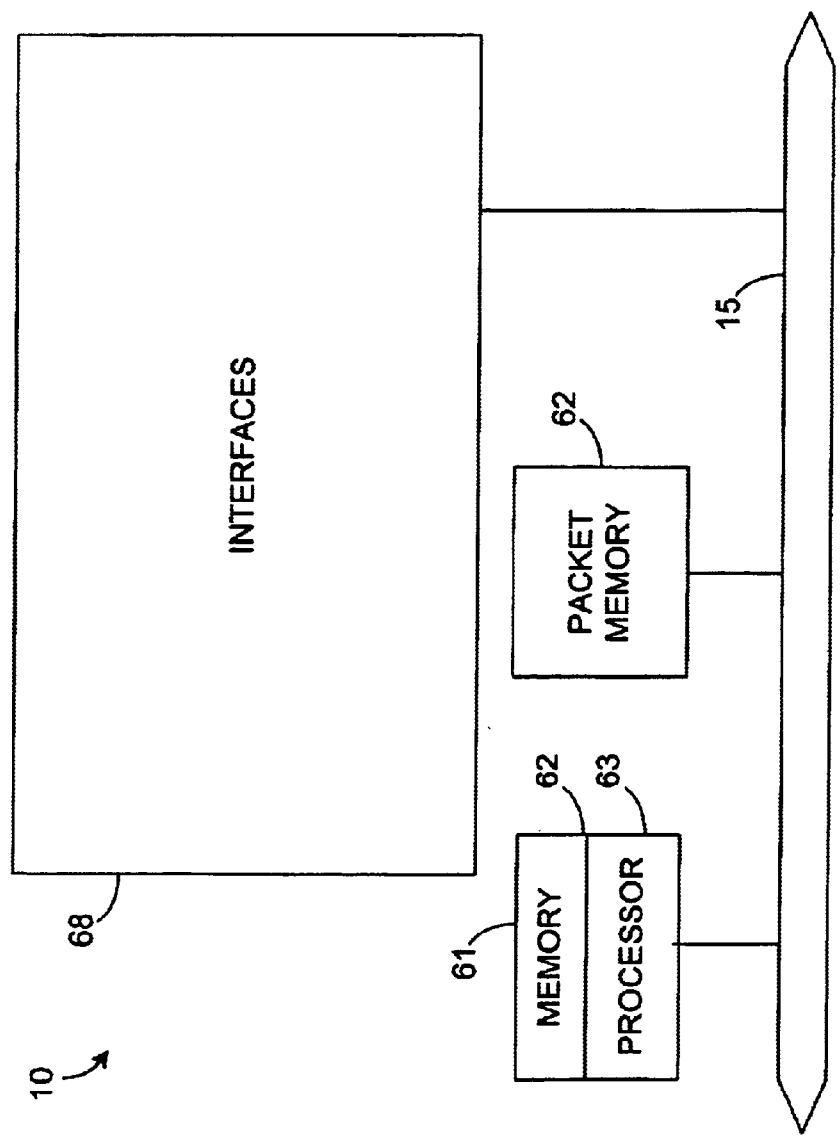
FIG. 1 is a simplified diagram of router hardware suitable for implementing one embodiment of the present invention.

Referring now to FIG. 1, a router 10 suitable for implementing the present invention includes a master central processing unit (CPU) 61, interfaces 68, and a bus 15 (e.g., a PCI bus). As shown, CPU 61 includes a memory 62 and a processor 63. When acting under the control of appropriate software or firmware, CPU 61 is responsible for such router tasks as routing table computations, network management, and general processing of packets. It preferably accomplishes all these functions under the control of software including an operating system (e.g., a version of the Internetwork Operating System (IOS®) of Cisco Systems, Inc.) and any appropriate applications software. CPU 61 may include one or more processors 63 such as a processor from the Motorola family or microprocessors of the MIPS family of microprocessors. In an alternative embodiment, processor 63 is specially designed hardware for controlling the operations of router 10. Memory 62 can be non-volatile RAM and/or ROM. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the master microprocessor 61 to efficiently perform routing computations, network diagnostics, security functions, etc. Router 10 may further include a packet memory 72 for intermediate storage of packets being forwarded by router 10.

Although the system shown in FIG. 1 is one specific router of the present invention, it is by no means the only architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (including memory 62) configured to store program instructions for the general-purpose network operations and packet processing and management functions described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 2:
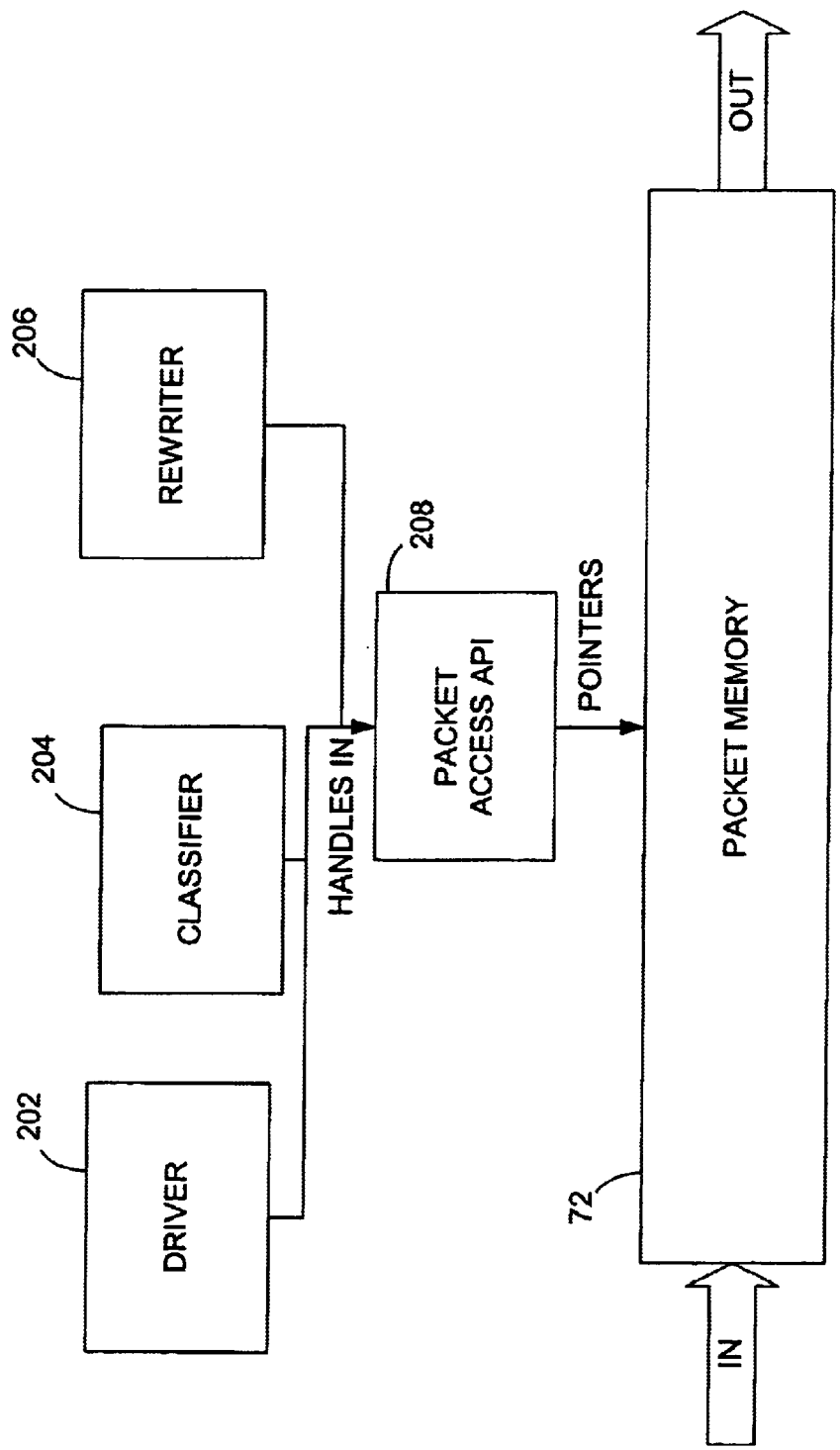
FIG. 2 is a diagram illustrating how packet memory may be accessed according to one embodiment of the present invention.

FIG. 2 depicts elements of a software architecture as may be found in a router or other system for processing packets according to one embodiment of the present invention. Packets to be forwarded by router 10 may be stored temporarily in packet memory 72 to implement router functionality. Various packet processing clients may need to access packets stored in packet memory 72. Examples of packet processing clients include a driver 202, classifier 204 and a rewriter 206.

Driver 202 can receive data from the network and write the data into a packet. Classifier 204 determines packet protocol type based on examination of the packet header to, e.g., support differentiated services. Rewriter 206 can, e.g., rewrite the MAC header of a packet passing through router 10. The various clients may need to, e.g., read from packets, write to packets, allocate memory space for new packets, and/or deallocate memory space for packets, etc.

According to one embodiment of the present invention, the clients do not access packets in packet memory 72 directly. Instead, there is a packet manager 208 which is the software entity responsible for managing the packets. By centralizing direct packet access in a single L software entity, the risk of corruption of packet data due to a fault in client operation is greatly reduced. The clients and packet manager 208 are preferably all software processes operating on CPU 61.

When one of the clients needs to access a particular packet in packet memory 72 it passes a handle to packet manager 208. Since the handle prevents direct access to packet memory 72, it can also be called an "opaque" handle. The handle is part of a call to an API which serves as an interface to packet manager 208. Based on the handle, packet manager 208 generates an actual pointer to packet memory 72 which can then be used to read or write packet data. If the API call includes data to be written, this data is written to the appropriate location in packet memory 72. If the API call was for a packet read, packet manager 208 can pass the read data back to the requesting client.

Whenever packet manager 208 restarts for any reason, it reinitializes packet memory 72. For example, a fault in the operation of packet manager 208 may cause a system operator to force a restart. Handles that are maintained by the various clients should then be invalidated because they no longer point to valid packet locations. To facilitate the process of invalidating old packet handles upon reset of packet manager 208, a version number for packet manager 208 is maintained. Version numbers begin at 0 or some other predetermined value upon a reset or system boot of router 10. The version number then increments every time packet manager 208 restarts. The version number may also be referred to as a respawn counter. The version number is included in handles created by packet manager 208.

Then when a handle is received as part of an API call, packet manager 208 checks that the version number of the handle is current. If the handle is generated by a previous version of the packet manager, the request for access is denied.

Figure 3:
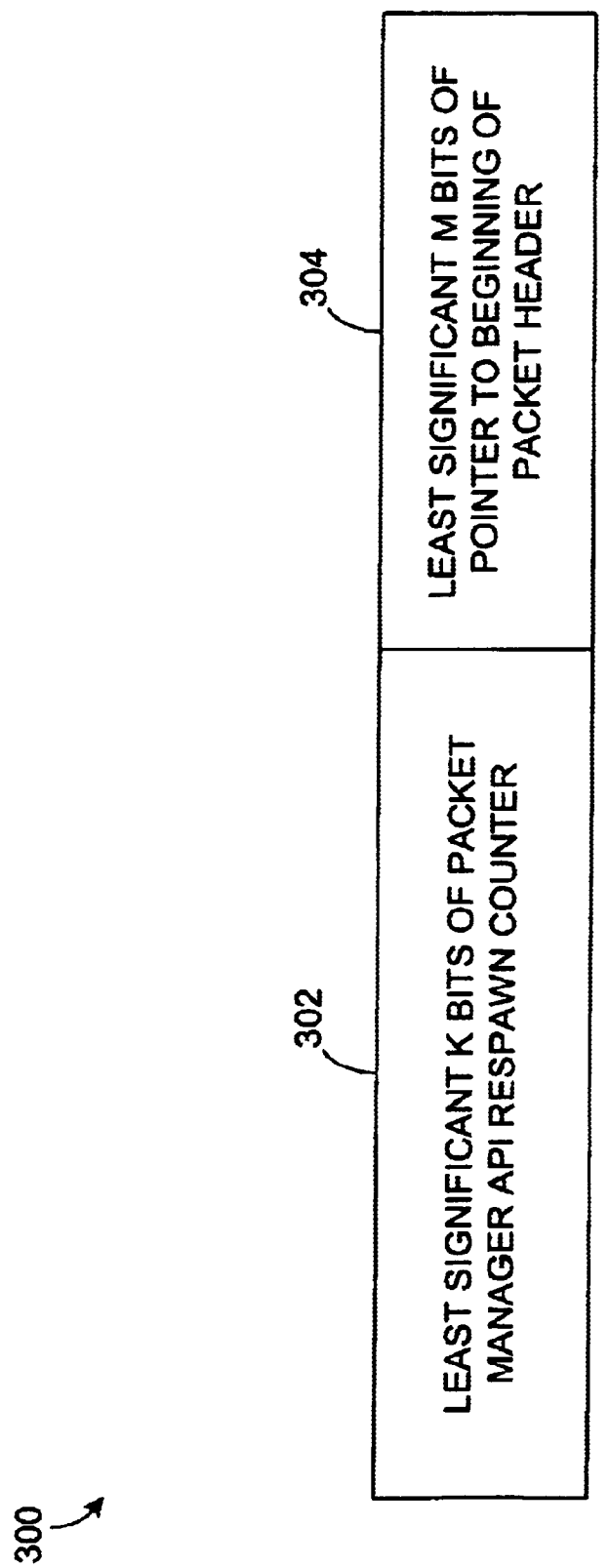
FIG. 3 depicts contents of a packet handle according to one embodiment of the present invention.

FIG. 3 depicts the structure of a packet handle according to one embodiment of the present invention. A handle 300 includes two fields, a respawn counter field 302 and a packet pointer field 304. A direct pointer to packet memory 72 has n +m bits. Packet pointer field 304 will include the least significant m bits of a pointer which specifies a memory address of the beginning of a packet header. Packet manager 208 maintains the most significant n bits which identify the address range occupied by all packet storage. Because packet pointer field 304 does not include the complete packet pointer, a client possessing handle 300 cannot access packet memory 72 without use of packet manager 208. The handle is therefore considered to be opaque.

Packet manager respawn counter field 302 includes the least significant k bits of the packet manager respawn counter value (version number) at the time the handle was generated. Thus when receiving packet access requests, packet manager 208 may distinguish between packet handles created by the last $2^k$ packet manager run versions.

Figure 4:
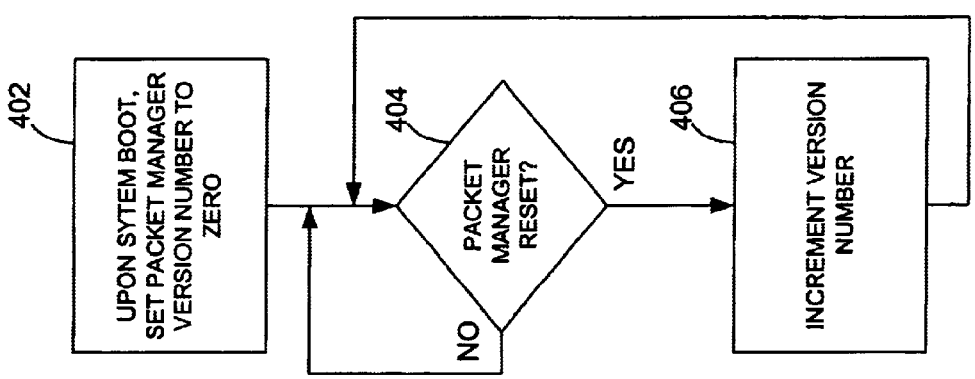
FIG. 4 is a flowchart describing steps of restarting the packet manager according to one embodiment of the present invention.

FIG. 4 is a flowchart describing steps of restarting packet manager 208 according to one embodiment of the present invention. Upon system boot or restart, the packet manager version number or respawn counter is set to 0 at step 402. Step 404 is a decision step which checks for a packet manager reset during the course of normal packet processing operations as will be described with reference to FIG. 5. If there is no reset, step 404 continues to test for one. If there is a reset, then the processing proceeds to step 406 where the version number is incremented. After step 406, step 404 again awaits the next reset.

Figure 5:
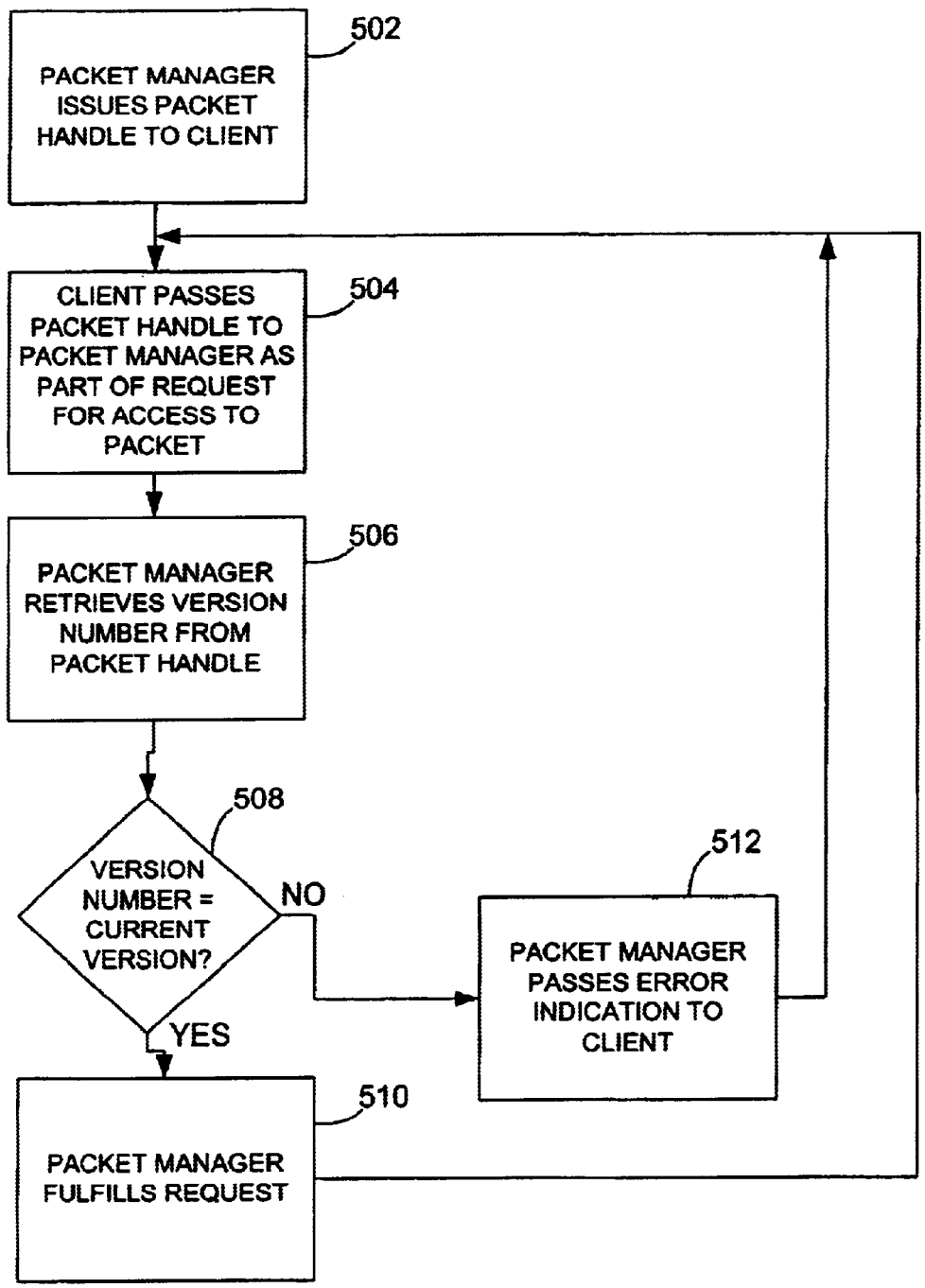
FIG. 5 is a flowchart describing steps of accessing packet memory according to one embodiment of the present invention.

FIG. 5 is a flowchart describing steps of accessing packet memory 72 according to one embodiment of the present invention. At step 502, packet manager 208 issues a packet handle to L a particular client in response to a client request to create a new packet.

Packet manager 208 includes its current version number within the newly issued packet handle. Step 502 will repeat for every packet handle issued to a client. At step 504 a client requests access to a particular packet. The access may be for the purpose of reading, writing, allocating, or deallocating, etc. The client requesting access need not be the client that requested the packet's creation. The request for access is transmitted to packet manager 208 as a call to the API. The call includes a handle previously issued to the client in one of the iterations of step 502.

At step 506, packet manager 208 retrieves the version number from the opaque packet handle included in the call of step 504. Step 508 tests whether the version number retrieved from the packet handle is equivalent to the current version number of packet manager 208. If the version number from the packet handle does equal the current version number, packet manager 208 fulfills the request contained in the call at step 510. For example, packet manager 208 may read the contents of a particular packet and return the contents to the requesting client. Alternatively, packet manager 208 may write a particular value or values into the addressed packet.

A part of fulfilling the packet request will be translating the contents of packet pointer field 304 into the full pointer to the packet. The full pointer is constructed by replacing the n most significant bits of the packet handle with a value previously stored by packet manager 208. This previously stored value represents the n most significant bits portion of the packet memory address space.

If step 508 determines that the version number from the packet handle does not match the current version number, then at step 512, packet manager 208 returns an error indication to the requesting client. This indicates that the handle included in the client's request is no longer valid. The request is not fulfilled. After either step 510 or 512, packet manager 208 returns to step 504 to receive the next request for packet access.

It is understood that the examples and embodiments described herein are for illustrative purposes only and that various modifications and changes in light thereof will be suggested to persons skilled in the art and are to be included within the spirit and purview of this application and scope of the appended claims and their full scope of equivalents. All publications, patents, and patent applications cited herein are hereby incorporated by reference.

What is claimed is:

1. A computer-implemented method for providing packet processing routines with access to packets comprising:

initializing a packet manager version counter of said packet manager routine;

receiving a request for access to a selected packet, said request comprising a packet handle, said packet handle including an identifier specifying a run version of a packet manager routine and an identifier specifying said selected packet;

comparing said run version specified in said packet handle against a current value of the packet manager version counter of said packet manager routine to determine if said run version indicates that said packet handle was provided by a current version of said packet manager routine; and rejecting said request if said run version indicates said packet handle was not provided by said current version of said packet manager routine.

2. The method of claim 1 further comprising:

restarting said packet manager routine and incrementing the packet manager version counter of said packet manager routine.

3. The method of claim 1 wherein fulfilling comprises:

translating said identifier specifying said selected packet to a pointer to said memory; and accessing a location in said memory specified by said pointer.

4. The method of claim 1 further comprising:

passing an error indication from said packet manager routine to a packet processing routine issuing said request if said specified run version does not match said current value of said packet manager version counter.

5. The method of claim 1 further comprising:

prior to using said packet manager routine to receive a request, issuing said packet handle from said packet manager routine to a packet processing routine issuing said request.

6. The method of claim 1 wherein the packet manager version counter is a respawn counter.

7. A computer program product for providing packet processing routines with access to packets stored in a memory, said computer program product comprising:

code that uses a packet manager routine to receive a request for access to a selected packet, said request comprising a packet handle, said packet handle including an identifier specifying a run version of said packet routine and an identifier specifying said selected packet;

code that initializes a packet manager version counter of said packet manager routine;

code that checks said run version specified in said packet handle against a current value of the packet manager version counter of said packet manager routine to determine if said run version indicates that said packet handle was provided by a current version of said packet manager routine;

code that fulfills said request only if said current version matches said run version specified in said packet handle; and a computer-readable storage medium that stores the codes.

8. The computer program product of claim 7 further comprising:

code that restarts said packet manager routine and increments said packet manager version counter of said packet manager routine.

9. The computer program product of claim 7 wherein said code that fulfills comprises:

code that translates said identifier specifying said selected packet to a pointer to said memory; and code that accesses a location in said memory specified by said pointer.

10. The computer program product of claim 7 further comprising:
   code that passes an error indication from said packet manager routine to a packet processing routine issuing said request if said specified run version does not match said current value of said packet manager version counter.

11. The computer program product of claim 7 further comprising:
   code that issues said packet handle from said packet manager routine to a packet processing routine issuing said request.

12. The computer program product of claim 7 wherein said computer readable medium comprises a disk.

13. The computer program product of claim 7 wherein said computer readable medium comprises a memory device.

14. A computer-implemented method for providing packet processing routines with access to packets comprising:
   means that initialize a packet manager version counter of said packet manager routine;
   means that receive a request for access to a selected packet, said request comprising a packet handle, said packet handle including an identifier specifying a run version of a packet manager routine and an identifier specifying said selected packet;
   means that compare said run version specified in said packet handle against a current value of the packet manager version counter of said packet manager routine to determine if said run version indicates that said packet handle was provided by a current version of said packet manager routine; and
   means that reject said request if said run version indicates said packet handle was not provided by said current run version of said packet manager routine.

15. The method of claim 14 further comprising:
   means that restart said packet manager routine and increment the packet manager version counter of said packet manager routine.

16. The method of claim 14 wherein fulfilling comprises:
   means that translate said identifier specifying said selected packet to a pointer to said memory; and
   means that access a location in said memory specified by said pointer.

17. The method of claim 14 further comprising:
   means that pass an error indication from said packet manager routine to a packet processing routine issuing said request if said specified run version does not match said current value of the packet manager version counter.

18. The method of claim 14 further comprising:
   means that issue said packet handle from said packet manager routine to a packet processing routine issuing said request prior to using said packet manager routine to receive a request.

19. A computer-implemented method for providing packet processing routines with access to packets, said method comprising:
   means that transfer a packet handle from a packet processing routine to a packet management routine, said packet handle comprising fewer than all of a multiplicity of bits of an actual packet memory address, said packet handle including an identifier identifying a selected one of said packets;
   means that use said packet management routine to translate said identifier into a pointer to said memory; and
   means that access said memory at a location identified by said pointer.

20. The method of claim 19 wherein accessing comprises:
   means that write to said location with data received from said packet processing routine.

21. The method of claim 19 wherein accessing comprises:
   means that read data from said location and transfer said data to said packet processing routine.

22. The method of claim 19 further comprising:
   means that issuing said packet handle from said packet management routine to said packet processing routine prior to transferring said packet handle.

23. The method of claim 19 further comprising:
   means that invalidate said packet handle upon reset of said packet management routine.

* * * * *